(12) United States Patent
Calin

(10) Patent No.: US 8,031,725 B2
(45) Date of Patent: Oct. 4, 2011

(54) METHODS AND DEVICES FOR OBTAINING AND FORWARDING DOMAIN ACCESS RIGHTS FOR NODES MOVING AS A GROUP

(75) Inventor: Doru Calin, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 2001 days.

(21) Appl. No.: 10/778,190

(22) Filed: Feb. 17, 2004

(65) Prior Publication Data

US 2005/0182943 A1      Aug. 18, 2005

(51) Int. Cl.
*H04L 12/28* (2006.01)
*G06F 15/173* (2006.01)

(52) U.S. Cl. ........................................ 370/401; 709/226
(58) Field of Classification Search .................. 370/338, 370/401, 354; 713/182, 338; 709/226
See application file for complete search history.

(56) References Cited

U.S. PATENT DOCUMENTS

| | | | | |
|---|---|---|---|---|
| 5,761,619 A * | 6/1998 | Danne et al. | ................ | 455/422.1 |
| 5,802,457 A * | 9/1998 | Heiskari et al. | ................ | 455/88 |
| 6,105,132 A * | 8/2000 | Fritch et al. | .................... | 713/167 |
| 6,304,556 B1 * | 10/2001 | Haas | ............................. | 370/254 |
| 6,922,547 B2 * | 7/2005 | O'Neill et al. | .................. | 455/17 |
| 7,031,288 B2 * | 4/2006 | Ogier | ............................. | 370/338 |
| 2002/0141368 A1 * | 10/2002 | Cheung et al. | ................ | 370/338 |
| 2003/0097446 A1 * | 5/2003 | Takahashi et al. | ............ | 709/226 |
| 2003/0226037 A1 * | 12/2003 | Mak | ............................. | 713/201 |
| 2003/0235173 A1 * | 12/2003 | Wood | ............................ | 370/338 |
| 2003/0235175 A1 * | 12/2003 | Naghian et al. | ............... | 370/338 |
| 2005/0096993 A1 * | 5/2005 | Pradhan et al. | ................ | 705/24 |
| 2005/0097595 A1 * | 5/2005 | Lipsanen et al. | ................ | 725/25 |
| 2005/0149443 A1 * | 7/2005 | Torvinen | ........................ | 705/51 |

* cited by examiner

*Primary Examiner* — Kenny Lin
*Assistant Examiner* — Gerald Smarth
(74) *Attorney, Agent, or Firm* — Capitol Patent & Trademark Law Firm, PLLC

(57) ABSTRACT

The ability to maintain communications between wireless nodes (e.g., devices), moving substantially as a group, as the group moves from one domain to another is provided without the need for each member of the group to separately obtain domain access rights.

23 Claims, 1 Drawing Sheet

METHODS AND DEVICES FOR OBTAINING AND FORWARDING DOMAIN ACCESS RIGHTS FOR NODES MOVING AS A GROUP

BACKGROUND OF THE INVENTION

In a group wireless teleconference, the majority of the participants move substantially as a group. For example, the participants may be in a caravan of vehicles that are moving in the same direction. When the participants in the group teleconference move from one domain (e.g., subnetwork, portion of a network, or one or more networks) to another, the wireless teleconference can only be maintained if each of the participants in the group remains in contact with every other participant. To date, when the group of participants moves into another domain with their associated wireless devices a teleconference can be maintained provided each of the participating devices separately obtains its own access rights (e.g., authentication, authorization and accounting [AAA] rights) from the domain.

SUMMARY OF THE INVENTION

We have recognized that it would be advantageous to provide the ability to maintain a group teleconference without the need for each device to separately obtain its own access rights as the group moves into contact with a new domain.

To this end, a first node or device, e.g., wireless device, which is part of a group of devices or nodes moving substantially as a group, obtains access rights from a domain and forwards the obtained access rights to at least one other device within the group. Alternatively, instead of forwarding access rights, the first device may act as a gateway and only forward information to one or more devices within the group.

DETAILED DESCRIPTION OF THE INVENTION

Figure 1:
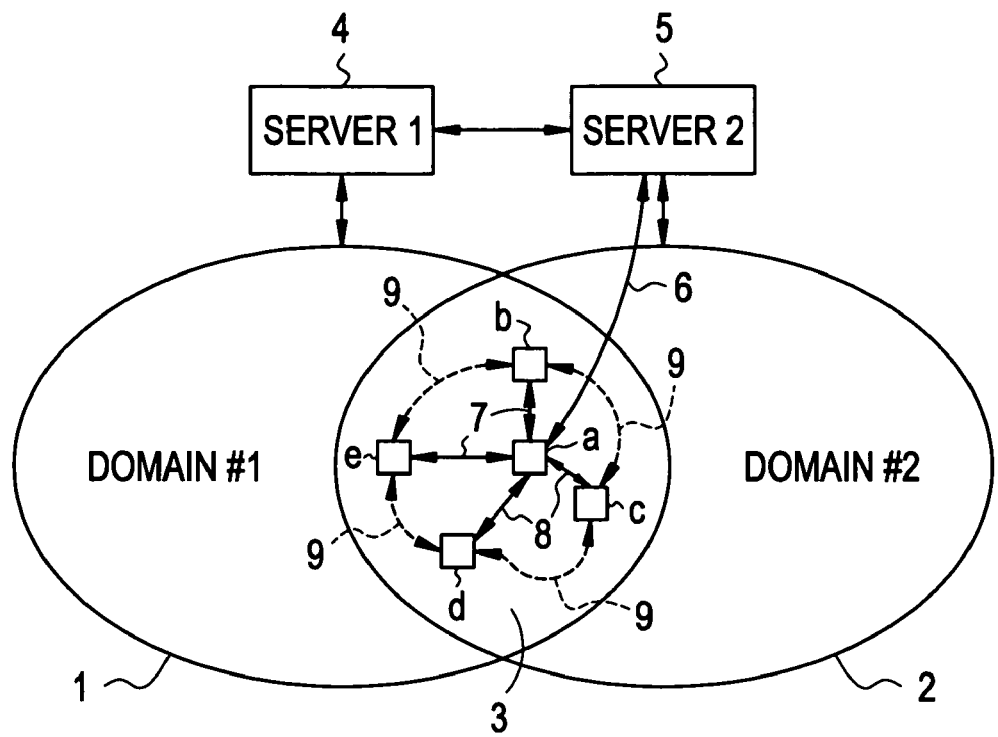
FIG. 1 depicts a simplified diagram of nodes moving substantially as a group and carrying out a group teleconference while moving from one domain to another according to one embodiment of the present invention.

Referring now to FIG. 1, there is shown nodes a-e moving substantially as a group (i.e., moving within close proximity of one another as in a caravan, etc.) and which are interconnected via pathways 9 shown by the dotted lines in FIG. 1. Obviously, multiple connectivity patterns are possible between the nodes belonging to the group. Thus, the connection pattern 9 shown in FIG. 1 is just one of a number of possible examples. As the group of interconnected nodes 9 moves from a first domain 1 to a second domain 2, it is necessary for each node to receive the proper access rights from a server 5 associated with the second domain 2. In one embodiment of the present invention, unlike existing techniques, it is not necessary for each of the nodes a-e to separately request access rights to receive such rights. Instead, all that is required is for a single node (for example node a in FIG. 1) to request and obtain access rights to the second domain 2. Once node a obtains these rights, node a is allowed to access the second domain 2. In addition, thereafter, node a (referred to as a "first" node) is operable to distribute or forward these rights to the other nodes b-e within the group while still retaining the access rights itself. It should be noted that all of the nodes a-e need not be wireless devices. Some of the nodes a-e may be "moving", wired devices. That is, some of the nodes may be connected or hard-wired to a transmitter which is part of a movable unit (e.g., mobile communications vehicle, mobile command and control centers used in military, police, fire, emergency medical applications). Similarly, some may be capable of receiving radio frequency signals while others may not be. According to the present invention, it is important that regardless of whether or not all of the nodes a-e or just some of the nodes a-e are wireless devices, that none of the nodes or devices a-e are dropped from a group teleconference or the like as the group of nodes/devices moves from one domain to another (i.e., they are not involuntarily dropped). In addition, the number of nodes within the group may change. Some nodes may be added; some nodes may voluntarily exit; some nodes may first exit and then reenter the group teleconference. As is recognized by those skilled in the art, when a node a-e within the group is operating using a wireless technology, and that node becomes disconnected from the group, it is necessary that the node be in the coverage area of at least one of the nodes of an initial group or in the coverage area of at least one node from a present group to be re-connected.

According to the present invention, each of the nodes a-e need not request its own, separate access rights in order to carry out communications between the remaining nodes participating in the group teleconference as the group of nodes moves from one domain to another. This significantly reduces the amount of bandwidth necessary to carry out such a group teleconference or the like. It also reduces the complexity of the signaling and security mechanisms needed to initiate, maintain and secure such a group teleconference or the like.

For example, and without limitation, perhaps each of the nodes represents one or more soldiers moving through a battlefield (e.g., in one or more closely spaced vehicles). As they move using predetermined maneuvers, they need to keep in constant contact with one another. The present invention will allow them to do so without any delay required by re-authorization or re-authentication of each separate device being used by a soldier.

The amount of communications needed between each of the nodes a-e and the second server 5 and between the second server 5 and the initial, first server 4 associated with the first domain 1 are reduced. For example, instead of exchanging information about each of the nodes a-e, the servers 4 and 5 need only exchange information about node a.

The interconnected nodes a-e may form one or more networks, such as a iDEN network, a 3G network or any other wireless network that allows group based communications (e.g., radio access may be Code Division Multiple Access (CDMA) based, Time Division Multiple Access (TDMA) based or based on any other radio access technology), a Bluetooth network, a military network or a 4G network, to name just a few. In general, any wired, wireless, ad-hoc or converged (combination of networks) network that supports the creation of interconnected devices moving as a group in order to carry out a group teleconference may be used.

Before going further it should be noted that the phrase "group teleconference" is meant to include the exchange of voice-, video-, text-, or image-based messages (to give a few examples) by a group of interconnected nodes.

Up to now discussion has centered on the operation of node a. It should be understood that each of the other nodes b-e are also operable to receive access rights forwarded by node a in order to allow the nodes b-e to access domain 2.

In a further embodiment of the present invention, node a may only forward access rights to some of nodes b-e within the group. In this case, only those nodes which receive the access rights are allowed to access domain 2.

In yet a further embodiment of the present invention, node a may be operable to only forward information (i.e., information other than access rights), not access rights, from the second domain 2 to other nodes b-e. In other words, suppose some of the nodes b-e are not granted access rights. Nevertheless, it is desirable to forward information from the second domain 2 to the unauthorized and unauthenticated nodes, b-e, that belong to the same group that the first node, node a, belongs to. The present invention envisions such a scenario and allows information to be forwarded from the second domain 2 via node a to the unauthorized nodes b-e. It can be said that node a acts as a trusted gateway to forward information to the unauthorized nodes b-e.

It should be understood that while the discussion is focused on node a as the first node, any of the other nodes b-e may also be subsequently substituted as the first node. In addition, though it is not necessary, any other node (or all of them) may subsequently request and obtain access rights if for whatever reason such rights are lost or otherwise invalidated.

Figure 2:
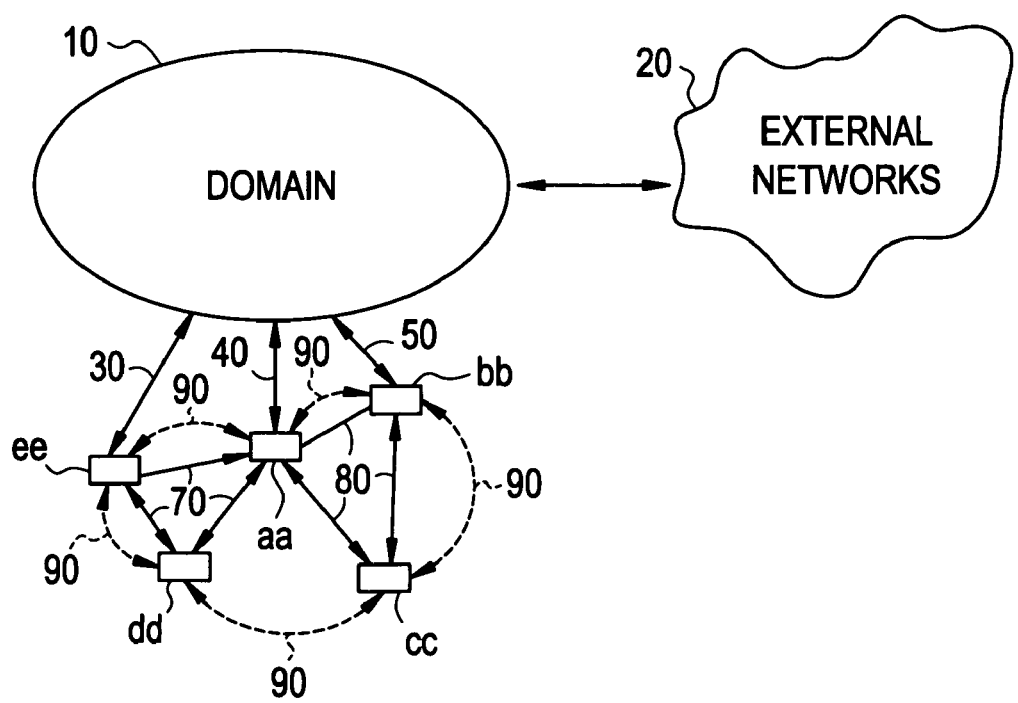
FIG. 2 depicts a simplified diagram of nodes moving substantially as a group and carrying out a group teleconference while moving from one domain to another according to yet another embodiment of the present invention.

Referring now to FIG. 2, there is shown another embodiment of the present invention. Here, more than one node aa, bb, ee is shown connected to a domain 10. These nodes aa, bb, ee may be more complex than the remaining nodes cc, dd. Nodes aa, bb, ee may be capable of decoding (e.g., decrypting) information. That is to say, nodes cc, dd may not be equipped to decode messages from the domain 10 even if these nodes are granted access rights from domain 10.

In one embodiment of the present invention, at least one of the nodes aa, bb, ee is operable to obtain access rights from the domain 10 in order to access domain 10. As shown, each of the three nodes aa, bb, ee obtains access rights from the domain 10. Thereafter, each of these nodes aa, bb, ee may forward the access rights to the remaining nodes cc, dd. Alternatively, each of the master nodes aa, bb, ee may be further operable to only forward information, not access rights, to each of the nodes cc, dd.

After obtaining access rights, nodes aa, bb, ee may be operable to decode/decrypt information sent from domain 10. In sum, it is not necessary for the nodes cc, dd to either obtain access rights to domain 10 or be capable of decoding information as long as a node aa, bb or ee has such rights and capabilities. Decryption just by certain nodes allows group communications to be secure without the need to provide each of the nodes with an encryption/decryption capability. This not only saves costs but reduces bandwidth requirements while providing more secure communications.

The discussion above has sought to present some of the examples of the present invention. However, the true scope of the present invention is defined by the claims which follow.

I claim:

1. A method for providing access rights to a domain comprising the steps of:
   obtaining, at a first node of a group of nodes moving as a group, access rights from a domain; and forwarding the obtained access rights from said first node within the moving group of nodes to at least one other node within the moving group of nodes without the need to receive a request from the at least one other node to forward the rights.

2. The method as in claim 1 further comprising the step of retaining said access rights at the first node.

3. The method as in claim 1 wherein the group of nodes comprises a group of wireless devices.

4. The method as in claim 1 wherein the group of nodes comprises both wireless and moving, wired devices.

5. The method as in claim 1 wherein the access rights are selected from the group consisting of at least authentication, authorization and accounting rights.

6. The method as in claim 1 further comprising the step of: receiving the forwarded access rights, by at least one other node within the group of nodes.

7. The method as in claim 1 further comprising the steps of:
   decoding at the first node, information from the domain; and
   forwarding the decoded information to the at least one other node within the group of nodes.

8. The method as in claim 7 further comprising the step of receiving
   the forwarded information by the at least one other node within the group of nodes.

9. The method as in claim 1 further comprising the step of forwarding
   information to at least one additional node within the group of nodes.

10. The method as in claim 1 wherein the step of obtaining access rights further comprises requesting access rights on behalf of all of the nodes
    within the group from a domain; and the step of forwarding access rights to at least one other node within the
    group allows the first node and at least one other node within the group access to the domain.

11. A device, within a group of devices moving as a
    group, operable to: obtain access rights from a domain at the device; and forward the obtained access rights from the device within the moving
    group of devices to at least one other device within the moving group of devices without the need to receive a request from the at least one other device to forward the rights.

12. The device as in claim 11 further operable to retain said access rights.

13. The device as in claim 11 wherein the group of devices comprises a
    group of wireless devices.

14. The device as in claim 11 wherein the group of devices comprises
    both wireless and moving, wired devices.

15. The device as in claim 11 wherein the access rights are selected
    from the group consisting of at least authentication, authorization and accounting rights.

16. The device as in claim 11 wherein the device is further operable to:
    decode information from the domain; and forward the decoded information to the at least one other device within
    the group of devices.

17. The device as in claim 11 wherein the device is further operable to
    forward information to at least one additional device within the group of devices.

18. The device as in claim 11 further operable to obtain access rights
    on behalf of all of the nodes within the group from a domain; and forward the access rights to at least one other node within the group to
    allow the first node and at least one other node within the group to access the domain.

19. A device, within a group of nodes moving as a group, comprising: means for obtaining access rights from a domain at the device; and means for forwarding the obtained access rights from the device within
the moving group of devices to at least one other device within the moving
group of devices without the need to receive a request from the at least one other device to forward the rights.

20. The device as in claim 18 further comprising means for retaining
said access rights.

21. The device as in claim 19 further comprising:
means for decoding information from the domain at the first node; and means for forwarding said decoded information to the at least one other
device within the group of devices.

22. The device as in claim 19 further comprising: means for forwarding information to at least one additional device within
the group of devices.

23. The device as in claim 19 further comprising means for obtaining
access rights on behalf of all of the nodes within the group from a domain; and means for forwarding the access rights to at least one other node within
the group to allow the first node and at least one other node within the group
to access the domain.

* * * * *